US010625720B2

(12) United States Patent
 Masuda et al.

(10) Patent No.: US 10,625,720 B2
(45) Date of Patent: Apr. 21, 2020

(54) VEHICLE BRAKING DEVICE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Yoshio Masuda, Anjo (JP); Masaki Ninoyu, Obu (JP); Takahiro Okano, Chiryu (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 98 days.

(21) Appl. No.: 15/772,767

(22) PCT Filed: Nov. 22, 2016

(86) PCT No.: PCT/JP2016/084680
 § 371 (c)(1),
 (2) Date: May 1, 2018

(87) PCT Pub. No.: WO2017/090634
 PCT Pub. Date: Jun. 1, 2017

(65) Prior Publication Data
 US 2019/0016317 A1    Jan. 17, 2019

(30) Foreign Application Priority Data

Nov. 24, 2015   (JP) ................................. 2015-228364

(51) Int. Cl.
 *B60T 8/172*     (2006.01)
 *B60T 13/74*     (2006.01)
 (Continued)

(52) U.S. Cl.
 CPC ................ *B60T 8/172* (2013.01); *B60T 8/00* (2013.01); *B60T 8/17* (2013.01); *B60T 8/4077* (2013.01);
 (Continued)

(58) Field of Classification Search
 CPC ... B60T 8/172; B60T 8/48; B60T 8/40; B60T 8/44; B60T 8/17; B60T 13/74; B60T 8/12; F17C 5/02
 See application file for complete search history.

(56) References Cited

U.S. PATENT DOCUMENTS 3,863,993  A  *  2/1975  Fleischer ............ B60T 8/17633
                                                      303/195
8,104,845  B2 *  1/2012  Itoh ....................... B60T 8/4059
                                                      303/191

(Continued)

FOREIGN PATENT DOCUMENTS

JP      H04-197865 A    7/1992
JP      2000-062589 A   2/2000
(Continued)

OTHER PUBLICATIONS

International Search Report (PCT/ISA/210) dated Feb. 14, 2017, by the Japanese Patent Office as the International Searching Authority for International Application No. PCT/JP2016/084680.

(Continued)

*Primary Examiner* — Yuri Kan
(74) *Attorney, Agent, or Firm* — Buchanan, Ingersoll & Rooney PC (57) ABSTRACT

A vehicle braking device performs a following control which makes an actual value of a physical quantity follow a first target value when the actual value of the physical quantity is a value outside a dead zone and a suppression control which suppresses a change of the actual value when (Continued)

the actual value is a value within the dead zone in order to control the physical quantity associated with the braking force to be the first target value. The vehicle braking device comprises a setting portion which sets a second target value which follows the first target value and which is smaller than the first target value, when the first target value is increasing and a control portion which performs a control to make the actual value approximate the second target value.

7 Claims, 4 Drawing Sheets

(51) Int. Cl.
*B60T 8/44* (2006.01)
*B60T 8/40* (2006.01)
*B60T 8/48* (2006.01)
*F17C 5/02* (2006.01)
*B60T 8/17* (2006.01)
*B60T 8/00* (2006.01)
*B60T 13/58* (2006.01)

(52) U.S. Cl.
CPC ......... *B60T 13/586* (2013.01); *B60T 2220/04* (2013.01); *B60T 2250/04* (2013.01)

(56) References Cited

U.S. PATENT DOCUMENTS

| | | | | |
|---|---|---|---|---|
| 9,028,013 | B2* | 5/2015 | Osakabe | B62D 63/04 303/114.1 |
| 2011/0285198 | A1* | 11/2011 | Nakata | B60K 6/445 303/3 |
| 2015/0127226 | A1 | 5/2015 | Takeuchi et al. | |
| 2015/0330571 | A1* | 11/2015 | Beuneken | F17C 5/02 141/4 |
| 2019/0077385 | A1* | 3/2019 | Okano | B60T 8/1701 |

FOREIGN PATENT DOCUMENTS

| | | |
|---|---|---|
| JP | 2005-035466 A | 2/2005 |
| JP | 2009-040376 A | 2/2009 |
| JP | 2014-004945 A | 1/2014 |

OTHER PUBLICATIONS

Written Opinion (PCT/ISA/237) dated Feb. 14, 2017, by the Japanese Patent Office as the International Searching Authority for International Application No. PCT/JP2016/084680.

* cited by examiner

VEHICLE BRAKING DEVICE

TECHNICAL FIELD

This invention relates to a vehicle braking device.

BACKGROUND ART

One type of a vehicle braking device has been known for example, in the Patent Literature 1. In the vehicle braking device shown in FIG. 1 of the Patent Literature 1, a feed-forward control and a feed-back control for a linear valve are executed so that the control hydraulic pressure Pwc which corresponds to the wheel cylinder pressure of each vehicle wheel becomes the target hydraulic pressure Pref. According to the vehicle braking device, a width of hydraulic pressure defined by the lower limit pressure Pl and the upper limit pressure Pu with respect to the center of the target hydraulic pressure Pref is set as a dead zone. When the control pressure Pwc is within the dead zone, no pressure decreasing operation or increasing operation is performed and as a holding mode, the pressure is controlled to close the linear valve. Further, according to the vehicle braking device, when the control pressure Pwc is below the lower limit Pl of the dead zone, the pressure increasing valve is opened to increase the control pressure Pwc (pressure increasing mode). Oppositely, when the control pressure Pwc is over the upper limit Pu of the dead zone, the pressure decreasing valve is opened to decrease the control pressure Pwc (pressure decreasing mode).

CITATION LIST

Patent Literature

[Patent Literature 1] JP2005/035466 A

SUMMARY OF INVENTION

Technical Problem(s)

The vehicle braking device according to the Patent literature 1 as listed above performs the above control always based on the deviation in pressure between the target hydraulic pressure Pref and the control hydraulic pressure Pwc. Accordingly, the control hydraulic pressure Pwc easily enters in the dead zone. As a result, repetition between the holding operation and the pressure increasing or decreasing operation of the control hydraulic pressure Pwc occurs frequently, which may lead to a stepwise change of the control hydraulic pressure Pwc.

Accordingly, this invention was made in consideration with the above-mentioned situation and the invention pertains to provide a vehicle braking device which can achieve improvements in pressure adjustment control performance.

Solution to Problem(s)

In order to solve the above problems, the vehicle braking device according to the invention of claim 1 performs a following control which makes an actual value of a physical quantity which is associated with a braking force to be applied to a vehicle wheel follow a first target value which is a target value of the physical quantity when the actual value of the physical quantity is a value outside a dead zone and a suppression control which suppresses a change of the actual value when the actual value is a value within the dead zone, in order to control the physical quantity associated with the braking force to be the first target value which is the target value of the physical quantity, assuming that the dead zone is defined to be a value between a first threshold value which is smaller than the first target value and a second threshold value which is greater than the first target value, wherein the vehicle braking device includes a setting portion which sets a second target value which follows the first target value and which is smaller than the first target value, when the first target value is increasing, and a control portion which performs a control to make the actual value approximate the second target value.

Effect of Invention

In order to control the braking force applied to the vehicle wheel, the vehicle braking device performs a following control which makes the actual value of physical quantity as a control object to follow the first target value which is the target value of the physical quantity when the actual value of physical quantity is the value outside the dead zone and performs the suppression control which suppresses the change of the actual value when the actual value is the value within the dead zone, assuming that the dead zone is defined to be a value between a first threshold value which is smaller than the first target value and a second threshold value which is greater than the first target value. In such control, while the first target value is increasing, if the actual value becomes a value within the dead zone, the change of the actual value is suppressed and accordingly, the actual value may become a value outside the dead zone. Then, such actual value is controlled to follow the first target value and again the actual value returns to a value within the dead zone. Thus, the actual value is considered to be increasing stepwise.

Accordingly, the vehicle braking device of the invention of claim 1 makes the actual value approximate the second target value when the first target value is increasing by setting a second target value which follows the first target value and which is smaller than the first target value. Accordingly, while keeping the actual value to follow the first target value, the actual value is prevented from entering the dead zone and thus the stepwise increase of the actual value can be suppressed. Accordingly, the vehicle braking device which can improve the pressure adjustment control performance can be proposed.

EMBODIMENTS FOR IMPLEMENTING INVENTION

Figure 1:
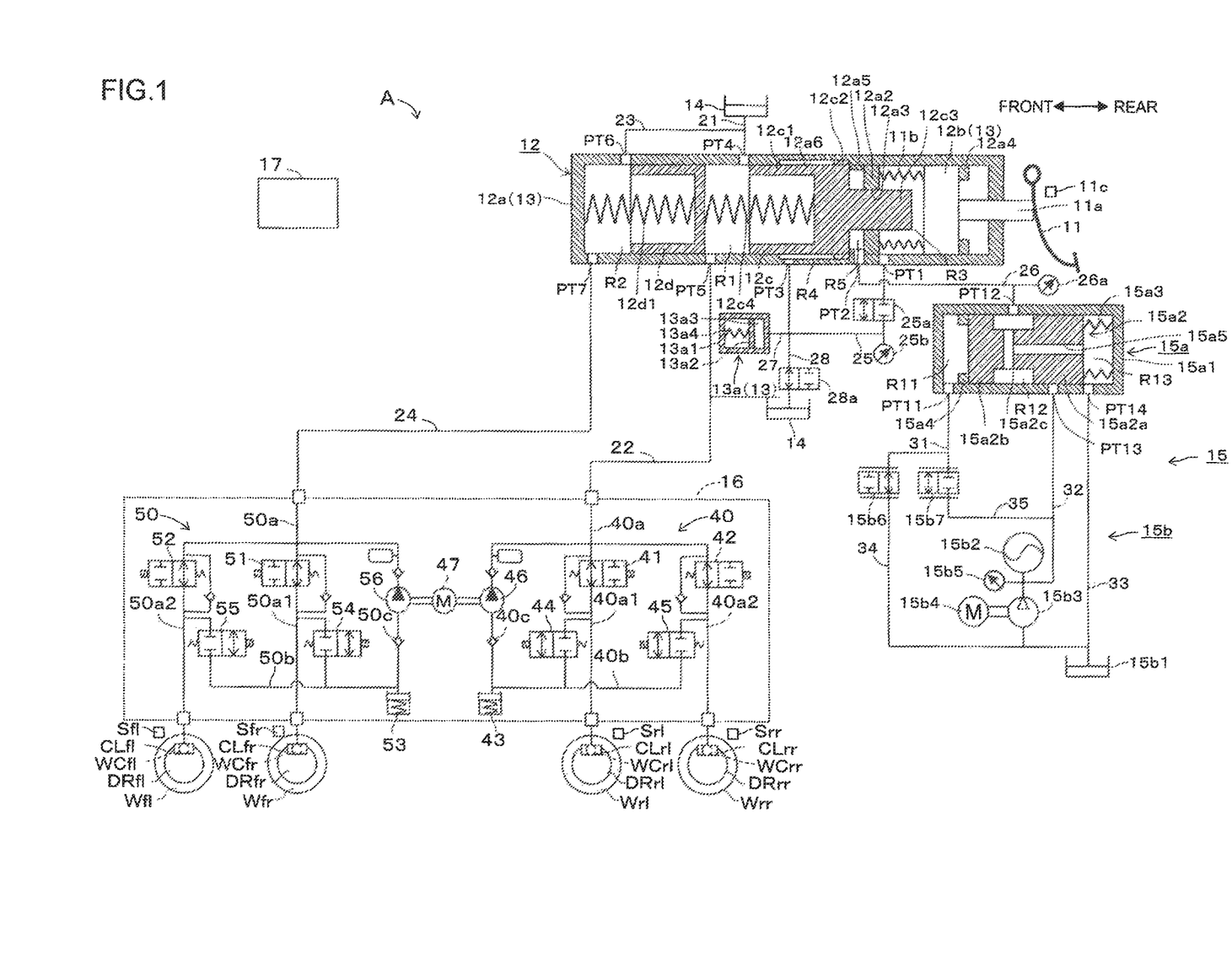
FIG. 1 is an outline schematic view of a vehicle braking device according to one embodiment of the invention.

The embodiment of the vehicle braking device according to one embodiment of the invention adapted to a vehicle will be explained hereinafter with reference to the attached drawings. The vehicle is equipped with a hydraulic pressure generating device A (vehicle braking device) which applies brakes to the vehicle by applying the hydraulic pressure braking force to directly to each vehicle wheel Wfl, Wfr, Wrl and Wrr. The hydraulic pressure braking force generating device A includes a brake pedal 11 which corresponds to a brake operating member, a master cylinder 12, a stroke simulator portion 13, a reservoir 14, a booster mechanism 15 (hydraulic pressure generating device), an actuator 16 (brake hydraulic pressure adjusting device) and a wheel cylinder WC, as shown in FIG. 1. The hydraulic pressure braking force generating device A corresponds to the vehicle braking device.

The wheel cylinder WC restricts the rotation of the respective wheels W and is disposed in the caliper CL. The wheel cylinder WC serves as a braking force applying mechanism which applies braking force to the wheels W of the vehicle based on the pressure of the brake fluid (brake hydraulic pressure) from the actuator 16. When the brake hydraulic pressure is supplied to the wheel cylinder WC, each piston (not shown) in each wheel cylinder WC pushes a pair of brake pads (not shown) which serves as a friction member and squeezes a disc rotor DR which serves as a rotational member rotating unitary with the wheel W from both sides thereof to thereby restrict the rotation of the rotor DR. It is noted here that in this embodiment, a disc type brake device is used but a drum type brake device may be used. The wheel W means either one of the right/left front/rear wheels Wfr, Wfl, Wrr and Mi.

The brake pedal 11 is connected to the stroke simulator portion 13 and the master cylinder 12 via an operation rod 11a.

A pedal stroke sensor 11c (hereinafter referred to also simply as "stroke sensor") which detects a brake pedal stroke (operation amount: hereinafter referred to simply as "stroke") which corresponds to a braking operation state by depression of the brake pedal 11 is provided in the vicinity of the brake pedal 11. The brake ECU 17 is connected to this stroke sensor 11c and the detected signal (detection result) from the stroke sensor 11c is outputted to the brake ECU 17.

The master cylinder 12 supplies the actuator 16 with the brake fluid in response to the operation amount of the brake pedal 11 (brake operating member) and is formed by a cylinder body 12a, an input piston 12b, a first master piston 12c and a second master piston 12d, etc.

The cylinder body 12a is formed in a substantially bottomed cylinder shape housing having a bottom surface closed. The cylinder body 12a includes therein a partition wall portion 12a2 which extends inwardly with a shape of flange at the inner peripheral side of the cylinder body 12a. An inner circumferential surface of the partition wall portion 12a2 is provided with a through hole 12a3 at a central portion thereof, penetrating through the partition wall portion 12a2 in front and rearward direction. The cylinder body 12a is provided with a first master piston 12c and a second master piston 12d at an inner peripheral portion thereof at a portion further front side than the partition wall portion 12a2. The first and the second master pistons 12c and 12d are liquid-tightly movable in an axial direction in the cylinder body 12a.

The cylinder body 12a is provided with an input piston 12b at an inner peripheral portion thereof at a portion further rear side than the partition wall portion 12a2. The input piston 12b is liquid-tightly movable in an axial direction in the cylinder body 12a. The input piston 12b slidably moves within the cylinder body 12a in response to the operation of the brake pedal 11.

The operating rod 11a which is operable in association with the brake pedal 11 is connected to the input piston 12b. The input piston 12b is biased in a direction where the volume of the first hydraulic pressure chamber R3 expands, i.e., in a rearward direction (right/left direction as viewed in the drawing) by means of a compression spring 11b. When the brake pedal 11 is depressed, the operating rod 11a advances forward overcoming the biasing force of the compression spring 11b. By this advance movement of the operating rod 11a, the input piston 12b advances in association with the movement of the operating rod 11a. When the depression operation of the brake pedal 11 is released, the input piston 12b retreats by the biasing force of the compression spring 11b and is brought into contact with a restriction projecting portion 12a4 for positioning.

The first master piston 12c includes a pressurizing cylindrical portion 12c1, a flange portion 12c2 and a projecting portion 12c3 in order from the front and these portions are formed integrally as a unit. The pressurizing cylindrical portion 12c1 is formed in a substantially bottomed cylinder shape having an opening at a front portion thereof and a bottom wall at a rear portion thereof. The pressurizing cylindrical portion 12c1 is liquid-tightly movably provided in the inner peripheral surface of the cylinder body 12a. A coil spring-shaped biasing member 12c4 is provided in the inner space of the pressurizing cylindrical portion 12c1 between the first master piston 12c and the second master piston 12d. The first master piston 12c is biased in a rear direction by the coil spring 12c4. In other words, the first master piston 12c is biased by the coil spring 12c4 in a rearward direction and is finally brought into contact with a restriction projecting portion 12a5 for positioning. This position is defined to be the initial position (predetermined position) at the time the depression operation of the brake pedal 11 is released.

The flange portion 12c2 is formed to have a greater diameter than the diameter of the pressurizing cylindrical portion 12c1 and is liquid-tightly and slidably disposed on an inner peripheral surface of a large diameter portion 12a6 in the cylinder body 12a. The projecting portion 12c3 is formed to have a smaller diameter than the diameter of the pressurizing cylindrical portion 12c1 and is slidably in liquid-tightly provided on the through hole 12a3 of the partition wall portion 12a2. The rear end of the projecting portion 12c3 projects into an inner space of the cylinder body 12a, passing through the through hole 12a3 and is separated from the inner peripheral surface of the cylinder body 12a. The rear end surface of the projecting portion 12c3 is separated from the bottom wall (front end surface) of the input piston 12b and the separation distance is formed to be variable.

The second master piston 12d is arranged in the cylinder body 12a at a front side relative to the first master piston 12c. The second master piston 12d is formed in a substantially bottomed cylinder shape having an opening at a front portion thereof. A coil spring 12d1 which serves as a biasing member is disposed in the inner space of the second master piston 12d between the second piston 12d and a closed inner bottom surface of the cylinder body 12a. The second master piston 12d is biased by the coil spring 12d1 in a rearward direction. In other words, the second master piston 12d is biased by the coil spring 12d1 towards a predetermined initial position.

The master cylinder 12 is formed by a first master chamber R1, a second master chamber R2, a first hydraulic pressure chamber R3, a second hydraulic pressure chamber R4 and a servo chamber (driving hydraulic pressure chamber) R5. The first master chamber R1 is defined by the inner peripheral surface of the cylinder body 12a, the first master piston 12c (front side of the pressurizing cylindrical portion 12c1) and the second master piston 12d. The first master chamber R1 is connected to the reservoir 14 via the hydraulic passage 21 which is connected to the port PT4. Further, the first master chamber R1 is connected to the hydraulic passage 40a (actuator 16) via the hydraulic passage 22 which is connected to the port PT5.

The second master chamber R2 is defined by the inner peripheral surface of the cylinder body 12a and the front side of the second master piston 12d. The second master chamber R2 is connected to the reservoir 14 via the hydraulic passage 23 which is connected to the port PT6. Further, the second master chamber R2 is connected to the hydraulic passage 50a (actuator 16) via the hydraulic passage 24 which is connected to the port PT7.

The first hydraulic pressure chamber R3 is formed between the partition wall portion 12a2 and the input piston 12b and is defined by the inner peripheral surface of the cylinder body 12a, the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the large diameter portion 12a6 of the cylinder body 12a, the pressurizing cylindrical portion 12c1 and the flange portion 12c2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12a2 and the pressurizing cylindrical portion 12c1 of the first master piston 12c and is defined by the inner peripheral surface of the cylinder body 12a, the partition wall portion 12a2, the projecting portion 12c3 of the first master piston 12c and the pressurizing cylindrical portion 12c1. The servo chamber R5 is connected to the output chamber R12 via the hydraulic passage 26 which is connected to the port PT2. The servo chamber R5 corresponds to the hydraulic pressure chamber defined in the appended claims.

The pressure sensor 26a is a sensor that detects the servo pressure (driving hydraulic pressure) which is supplied to the servo chamber R5 and is connected to the hydraulic passage 26. The pressure sensor 26a sends the detection signal (detection result) to the brake ECU 17. It is noted here that this servo pressure corresponds to the hydraulic pressure in the hydraulic pressure chamber and also the physical quantity associated with the braking force applied to the vehicle wheel respectively defined in the appended claims. It is also noted that the physical quantity is not limited to this servo pressure and the wheel cylinder pressure or the master cylinder pressure may be included as the physical quantity.

The stroke simulator portion 13 is formed by the cylinder body 12a, the input piston 12b, the first hydraulic pressure chamber R3 and a stroke simulator 13a which is in fluid communication with the first hydraulic pressure chamber R3.

The first hydraulic pressure chamber R3 is in fluid communication with the stroke simulator 13a via the hydraulic passages 25 and 27 which are connected to the port PT1. It is noted that the first hydraulic pressure chamber R3 is in fluid communication with the reservoir 14 via a connection passage (not shown).

The stroke simulator 13a generates a stroke (reaction force) which magnitude depends on the operation state of the brake pedal 11. The stroke simulator 13a is formed by a cylindrical portion 13a1, a piston portion 13a2, a reaction force hydraulic pressure chamber 13a3 and a spring 13a4.

The piston portion 13a2 liquid-tightly slidably moves within the cylindrical portion 13a1 in response to the braking operation by the brake pedal 11. The reaction force hydraulic pressure chamber 13a3 is formed between and defined by the cylindrical portion 13a1 and the piston portion 13a2. The reaction force hydraulic pressure chamber 13a3 is in fluid communication with the first hydraulic pressure chamber R3 and the second hydraulic pressure chamber R4 via the hydraulic passages 27 and 25. The spring 13a4 biases the piston portion 13a2 in a direction where the volume of the reaction force hydraulic pressure chamber 13a3 decreases.

It is noted that the first control valve 25a which is a normally closed type electromagnetic valve is disposed in the hydraulic passage 25. The second control valve 28a which is a normally open type electromagnetic valve is disposed in the hydraulic passage 28 which connects the hydraulic passage 25 and the reservoir 14. When the first control valve 25a is in a closed state, the fluid communication between the first and the second hydraulic pressure chambers R3 and R4 is interrupted. This fluid communication interruption keeps the constant separation distance between the input piston 12b and the first master piston 12c to allow the coordinative movement therebetween. Further, when the first control valve 25a is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12c can be absorbed by the transfer of the brake fluid.

The pressure sensor 25b is a sensor that detects the reaction force hydraulic pressure in the second hydraulic pressure chamber R4 and the first hydraulic pressure chamber R3 and is connected to the hydraulic passage 25. The pressure sensor 25b detects the pressure in the second hydraulic pressure chamber R4 when the first control valve 25a is in a closed state and also detects the pressure (or the reaction force hydraulic pressure) in the first hydraulic pressure chamber R3 which is in fluid communication with the second hydraulic pressure chamber R4 when the first control valve 25a is in an open state. The pressure sensor 25b sends the detected signal (detection result) to the brake ECU 17.

The booster mechanism 15 generates a servo pressure in response to the operation amount of the brake pedal 11. The booster mechanism 15 includes a regulator 15a and a pressure supply device 15b.

The regulator 15a is configured to have a cylinder body 15a1 and a spool 15a2 which slides in the cylinder body 15a1. A pilot chamber R11, an output chamber R12 and a hydraulic pressure chamber R13 are provided in the regulator 15a.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the second large diameter portion 15a2b with the restriction projecting portion 15a4.

The output chamber R12 is defined by the cylinder body 15a1 and the small diameter portion 15a2c of the spool 15a2, the rear end surface of the second large diameter portion 15a2b and the front end surface of the first large diameter portion 15a2a. The output chamber R12 is connected to the servo chamber R5 of the master cylinder 12 via the hydraulic passage 26 which is connected to the port PT12 and the port PT2. Further, the output chamber R12 is connectable with the accumulator 15b2 via the hydraulic passage 32 which is connected to the port PT13.

The hydraulic pressure chamber R13 is defined by the cylinder body 15a1 and the rear end surface of the first large diameter portion 15a2a of the spool 15a2. The hydraulic pressure chamber R13 is connectable with the reservoir 15b1 via the hydraulic passage 33 which is connected to the port PT14. A spring 15a3, which biases the spool 15a2 in a direction where the volume of the hydraulic pressure chamber R13 increases, is disposed in the hydraulic pressure chamber R13.

The spool 15a2 is formed by the first large diameter portion 15a2a, the second large diameter portion 15a2b and the small diameter portion 15a2c. The first large diameter portion 15a2a and the second large diameter portion 15a2b are structured to be liquid-tightly movable within the cylinder body 15a1. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b. Further, a communication passage 15a5 which connects the output chamber R12 and the hydraulic pressure chamber R13 is formed in the spool 15a2.

The pressure supply device 15b also serves as a drive portion which drives the spool 15a2. The pressure supply device 15b includes a reservoir 15b1 which is a low pressure source, an accumulator 15b2 which is a high pressure source that accumulates the brake fluid, a pump 15b3 which pumps the brake fluid from the reservoir 15b1 into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure in the low pressure source is lower than the pressure in the high pressure source. The pressure supply device 15b is provided with a pressure sensor 15b5 which detects the pressure of the brake fluid supplied from the accumulator 15b2 and outputs the detected result to the brake ECU 17.

Further, the pressure supply device 15b is provided with a pressure decreasing valve 15b6 and a pressure increasing valve 15b7. The pressure decreasing valve 15b6 is provided between the servo chamber R5 and the output chamber R12 (hydraulic pressure chamber) and a reservoir 15b1 (low pressure source) which pressure is lower than the accumulator 15b2 as the high pressure source and is configured to be a pressure decreasing electromagnetic valve which adjusts the flow-rate of the brake fluid flowing into the reservoir 15b1 from the servo chamber R5 and the output chamber R12. The pressure decreasing valve 15b6 is a normally open type electromagnetic valve which opens in a non-energized state. The flow-rate of the pressure decreasing valve 15b6 is linearly controlled by the instructions from the brake ECU 17. The pressure decreasing valve 15b6 becomes in a fluid communicable state when the control current of the solenoid coil equipped in the pressure decreasing valve 15b6 becomes zero (at non-energized state). By adjusting the control current therethrough, the cross-sectional area of the flow passage can be adjusted to adjust the flow-rate of the pressure decreasing valve 15b6. One side of the pressure decreasing valve 15b6 is connected to the pilot chamber R11 via the hydraulic passage 31 and the other side thereof is connected to the reservoir 15b1 via the hydraulic passage 34.

The pressure increasing valve 15b7 is provided between the servo chamber R5 and the output chamber R12 (hydraulic pressure chamber) and the accumulator 15b2 which is the high pressure source and is a type of pressure increasing electromagnetic valve which adjusts the flow-rate of the brake fluid flowing into the servo chamber R5 and the output chamber R12 from the accumulator 15b2. The pressure increasing valve 15b7 is a normally closed type electromagnetic valve which closes in a non-energized state. The flow-rate of the pressure increasing valve 15b7 is controlled by the instructions from the brake ECU 17. The pressure increasing valve 15b7 becomes in a fluid interrupted state when the control current of the solenoid coil equipped in the pressure increasing valve 15b7 becomes zero (at non-energized state). By adjusting the control current therethrough, the cross-sectional area of the flow passage can be adjusted to adjust the flow-rate of the pressure increasing valve 15b7. One side of the pressure increasing valve 15b7 is connected to the pilot chamber R11 via the hydraulic passage 31 and the other side thereof is connected to the accumulator 15b2 via the hydraulic passage 35 and the hydraulic passage 32 to which the hydraulic passage 35 is connected.

The operation of the regulator 15a will be explained briefly hereinafter. In the case where the pilot pressure is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position immediately before the rear end surface of the spool 15a2 closes the port PT14.

As explained, when the spool 15a2 is in the initial position, the port PT14 and the port PT12 are in fluid communication with each other through the communication passage 15a5 and at the same time the port PT13 is closed by the spool 15a2.

In the case where the pilot pressure formed by the pressure decreasing valve 15b6 and the pressure increasing valve 15b7 increases in response to the brake pedal 11 operation, the spool 15a2 moves in a rearward direction (right side in FIG. 1), overcoming the biasing force of the spring 15a3. The spool 15a2 moves to the position where the port PT13 is open. Then, the port PT14 which has been in the open state, is closed by the spool 15a2.

(Pressure increasing operation).

By the force balance between the pushing force at the front end surface of the second large diameter portion 15a2b2 of the spool 15a2 and the force corresponding to the servo pressure, the position of the spool 15a2 is fixed. This position of the spool 15a2 is defined to be the "holding position". The port PT13 and the port PT14 are closed by the spool 15a2. (Holding operation).

In the case where the pilot pressure formed by the pressure decreasing valve 15b6 and the pressure increasing valve 15b7 decreases in response to the brake pedal 11 operation, the spool 15a2 which is in the holding position now moves in a frontward direction by the biasing force of the spring 15a3. Then, the port PT13 which has been in the closed state by the spool 15a2 keeps the closed state. The port PT14 which has been in the closed state is open. Under this state, the port PT14 and the port PT12 are in fluid communication with each other through the communication passage 15a5 (Pressure decreasing operation).

The actuator 16 is a device which adjusts the brake hydraulic pressure to be applied to each wheel cylinder WC and a first conduit system 40 and a second conduit system 50 are provided as a dual brake system. The first conduit system 40 controls the brake hydraulic pressure to be applied to the left rear wheel Wrl and the right rear wheel Wrr and the second conduit system 50 controls brake hydraulic pressure applied to the right front wheel Wfr and the left front wheel Wfl. In other words, the conduit system is a front/rear conduit brake system.

The hydraulic pressure supplied from the master cylinder 12 is transmitted to the respective wheel cylinders WCrl, WCrr, WCfr and WCfl through the conduit systems 40 and 50. In the first conduit system, the hydraulic passage 40a is disposed which connects the hydraulic passage 22 and the wheel cylinders WCrl, WCrr and in the second conduit system 50, the hydraulic passage 50a is disposed which connects the hydraulic passage 24 and the wheel cylinders WCfr, WCfl. Through these hydraulic passages 40a and 50a, the hydraulic pressure supplied from the master cylinder 12 is transmitted to the wheel cylinders WCrl, WCrr, WCfr and WCfl.

The hydraulic passages 40a and 50a are branched to two passages, 40a1 and 40a2 and 50a1 and 50a2, respectively. In the branched hydraulic passages 40a1 and 50a1, the first pressure increasing control valves 41 and 51, which control increasing of the brake hydraulic pressure to the wheel cylinders WCrl and WCfr, are disposed, respectively and in the branched hydraulic passages 40a2 and 50a2, the second pressure increasing valves 42 and 52 which control increasing of the brake hydraulic pressure to the wheel cylinders WCrr and WCfl, are disposed respectively.

These first pressure increasing valves 41, 42 and the second pressure increasing valves 51, 52 are formed by a two-position electromagnetic valve which can control the valve state to the communication state and the interrupted state. The first pressure increasing valves 41, 42 and the second pressure increasing valves 51, 52 are formed by a normally open type valve which controls the valve state such that when the control current to the solenoid coil provided in the first pressure increasing valves 41, 42 and the second pressure increasing valves 51, 52 is zero value (non-energized state), the valve becomes in a fluid communication state and when the control current to the solenoid coil flows (energized state), the valve becomes in a fluid interrupted state.

The passage portions between the first and the second pressure increasing valves 41, 42 and 51, 52 and the wheel cylinders WCrl, WCrr and WCfr, WCfl in the hydraulic passages 40a, 50a are connected to the reservoirs 43, 53 via the hydraulic passage 40b, 50b, respectively. The first pressure decreasing control valves 44, 45 and the second pressure decreasing control valves 54, 55 which are formed by a two-position electromagnetic valve which can control the valve state to the communication state and the interrupted state, are disposed in the hydraulic passages 40b, 50b, respectively. The first pressure decreasing valves 44, 45 and the second pressure decreasing valves 54, 55 are formed by a normally closed type valve which controls the valve state such that when the control current to the solenoid coil provided in the first pressure decreasing valves 44, 45 and the second pressure decreasing valves 54, 55 is zero value (non-energized state), the valve becomes in a fluid interrupted state and when the control current to the solenoid coil flows (energized state), the valve becomes in a fluid communication state.

The hydraulic passages 40c and 50c, which are the return hydraulic passages, are provided between the reservoirs 43, 53 and the main hydraulic passages 40a, 50a. The pumps 46 and 56 driven by the motor 47 are disposed in the hydraulic passages 40c and 50c for suctioning or discharging the brake fluid from the reservoirs 43, 53 towards the master cylinder 12 side or the wheel cylinders WCrl, WCrr and WCfr, WCfl side.

The pumps 46, 56 suctions the brake fluid from the reservoirs 43, 53 and discharges the same to the hydraulic passages 40a, 50a thereby to supply the wheel cylinder WCrl, WCrr and WCfr, WCfl side with the brake fluid.

The brake ECU 17 is structured such that the detection signals from the wheel speed sensors Sfl, Srr, Sfr and Srl which are provided at the respective vehicle wheels Wfl, Wrr, Wfr and Wrl are inputted thereto. The brake ECU 17 calculates the wheel speed of the respective wheels, a presumed vehicle speed and the slip ratio, etc., based on the detection signals from the wheel speed sensors Sfl, Srr, Sfr and Srl. The brake ECU 17 executes anti-skid control based on the calculation result.

Various controls using the actuator 16 are executed at the brake ECU 17. For example, the brake ECU 17 outputs the control current that controls the various control valves 41, 42, 44, 45, 51, 52, 54 and 55 and the motor 47 which drives pumps provided in the actuator 16 to control the hydraulic pressure circuit in the actuator 16 to thereby independently control the respective wheel cylinder pressure transmitted to the wheel cylinders WCrl, WCrr, WCfr and WCfl. For example, the brake ECU 17 executes the anti-skid control which prevents the wheels from locking by executing pressure decreasing, pressure increasing and holding operations when the vehicle wheels are about to slip in a braking operation, or executes a stability control (sideslip prevention control) which turns the vehicle with an ideal locus by suppressing the sideslip tendency (under steer or over steer tendency) by automatically pressurizing the wheel cylinder pressure of the control subject wheel.

Figure 2:
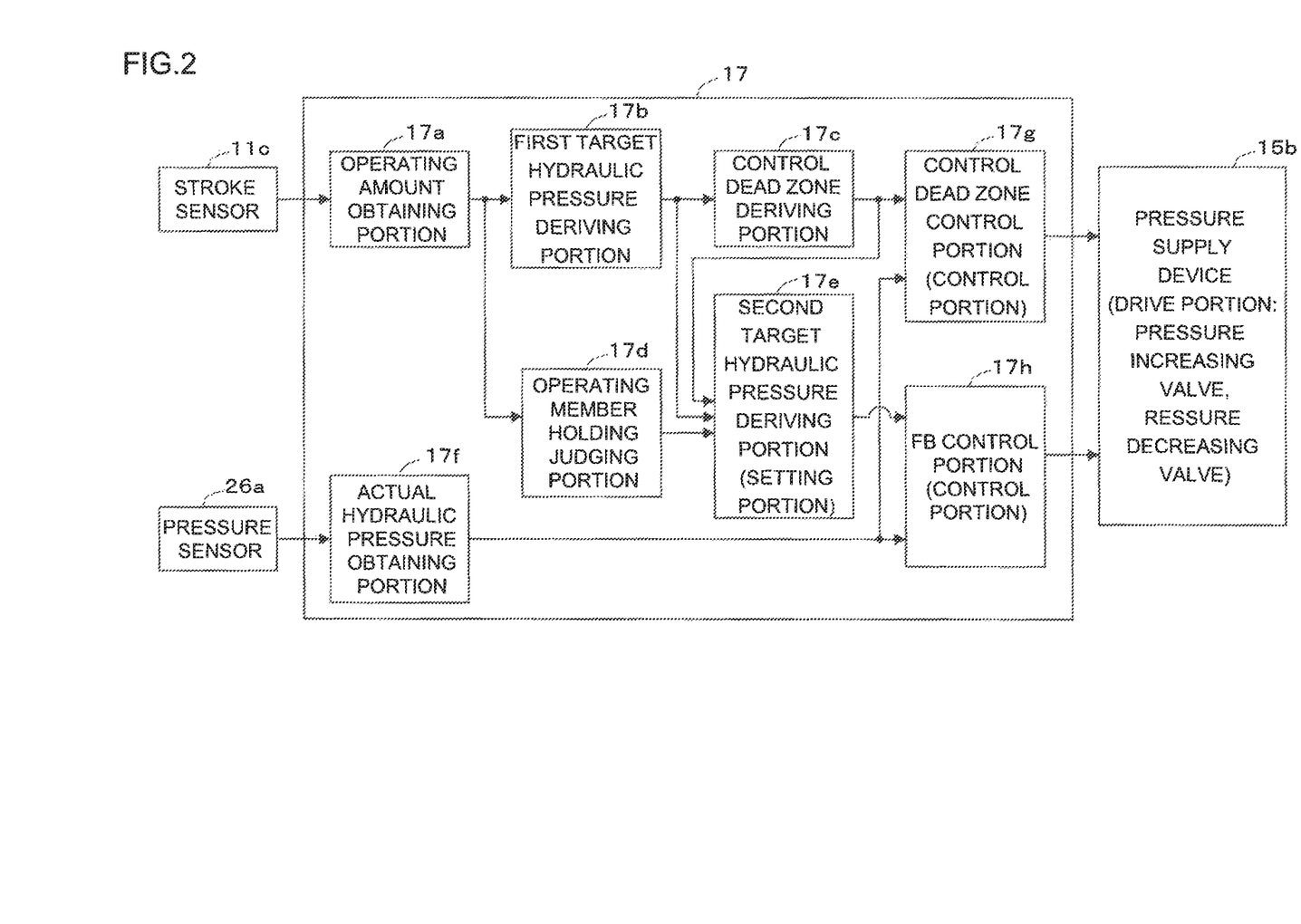
FIG. 2 is a block diagram of brake ECU indicated in FIG. 1.

The brake ECU 17 includes an operating amount obtaining portion 17a, a first target hydraulic pressure deriving portion 17b, a control dead zone deriving portion 17c, an operating member holding judging portion 17d, a second target hydraulic pressure deriving portion (setting portion) 17e, an actual hydraulic pressure obtaining portion 17f, a control dead zone control portion (control portion) 17g and a feed-back control portion (control portion: hereinafter also referred to as FB control portion) 17h.

In order to control the physical quantity (for example, servo pressure) associated with the braking force which is applied to the vehicle wheel to be the first target value (first target hydraulic pressure) which is the target value of the physical quantity, the brake ECU 17 performs a following control which makes the actual value (actual hydraulic pressure) of the physical quantity follow the first target value when the actual value of the physical quantity is a value outside the dead zone and performs a suppression control which suppresses a change of the actual value when the actual value is a value within the dead zone.

The operating amount obtaining portion 17a obtains the operating amount of the brake pedal 11 (operating amount associated with the brake operation: stroke) from the stroke sensor 11c. It is noted that the operating amount obtaining portion 17a may obtain an operating force detected by a sensor which directly detects the operating force (depression force) acted on the brake pedal 11, instead of obtaining the operating amount of the brake pedal 11.

The first target hydraulic pressure deriving portion 17b derives the first target hydraulic pressure (first target value) based on the operation state (for example, stroke) of the brake operating member by obtaining the stroke from the operating amount obtaining portion 17a or in response to a demand from other system. The first target hydraulic pressure corresponds to the target value of the physical quantity associated with the braking force to be applied to the vehicle wheel for example, corresponds to the control target of the servo pressure. Further, the first target hydraulic pressure may be a control target of the master cylinder pressure. (In such case, it is preferable to additionally provide a pressure sensor which detects the master cylinder pressure). For example, the first target hydraulic pressure deriving portion 17b comprises a map which indicates the correlation between the stroke and the first target hydraulic pressure, and derives the first target hydraulic pressure from such map.

As another system mentioned above, for example, a pre-crash system can be applicable, which prevents the collision of the vehicle by automatically generating the braking force when the vehicle is detected to be in a high risk of collision.

The control dead zone deriving portion 17c obtains the first target hydraulic pressure from the first target hydraulic pressure deriving portion 17b and derives the control dead zone from the first target hydraulic pressure. The control dead zone (dead zone) is set to have a first predetermined width range by referencing the first target hydraulic pressure and is a range in which the pressure increasing valve 15b7 and the pressure decreasing valve 15b6 are closed when the actual hydraulic pressure is within the first predetermined width range. For example, the control dead zone is a range where the first target hydraulic pressure is the center and is formed by a value separated from the center of the first target hydraulic pressure by a half of the first predetermined width. The lower limit value Pl of the control dead zone corresponds to a first threshold value which is smaller than the first target hydraulic pressure and, for example, is the value subtracting the half of the first predetermined width from the first target hydraulic pressure. The upper limit value Pu of the control dead zone corresponds to a second threshold value which is larger than the first target hydraulic pressure and, for example, is the value adding the half of the first predetermined width to the first target hydraulic pressure.

The operating member holding judging portion 17d obtains the operating amount of the brake pedal 11 from the operating amount obtaining portion 17a and judges whether the brake pedal 11 is in a holding state or not based on the obtained operating amount. The operating member holding judging portion 17d judges that the brake pedal 11 is in the holding state when the operating amount is constant and oppositely judges that the brake pedal 11 is not in the holding state when the operating amount is not constant (when the operating amount is variated). For example, when the brake pedal 11 is under depression or under releasing, such state is judged to be not in the holding state. When the brake pedal 11 is depressed and held at a predetermined position, the brake pedal 11 is judged to be in the holding state.

The second target hydraulic pressure deriving portion 17e obtains the first target hydraulic pressure from the first target hydraulic pressure deriving portion 17b and derives the second target hydraulic pressure (second target value) which phase is set in a more retarded side than the phase of the first target hydraulic pressure. The second target hydraulic pressure deriving portion 17e sets the second target hydraulic pressure which follows the first target hydraulic pressure and which is smaller than the first target hydraulic pressure when the first target hydraulic pressure is increasing and sets the second target hydraulic pressure which follows the first target hydraulic pressure and which is greater than the first target hydraulic pressure when the first target hydraulic pressure is decreasing. It is preferable for the second target hydraulic pressure deriving portion 17e to derive the second target hydraulic pressure from at least either one of the magnitude and the inclination of the first target hydraulic pressure. Further, it is preferable for the second target hydraulic pressure deriving portion 17e to set the second target hydraulic pressure to a value outside of the control dead zone. For example, it is preferable for the second target hydraulic pressure deriving portion 17e to set the second target hydraulic pressure to a value outside of the control dead zone (and at the same time in a phase retarded side) in the pressure increasing control where the pressures in the servo chamber R5 and the output chamber R12 are increasing or in the pressure decreasing control where the pressures in the servo chamber R5 and the output chamber R12 are decreasing under a state that the control dead zone has been obtained from the control dead zone deriving portion 17c. Further, it is preferable for the second target hydraulic pressure deriving portion 17e to have the second target hydraulic pressure gradually approximate the first target hydraulic pressure when the change width of the first hydraulic pressure is in a constant state within a predetermined value. In other words, the second target hydraulic pressure deriving portion 17e obtains the detection result from the operating member holding judging portion 17d, and when the operating amount of the brake pedal 11 is being held, it is preferable for the second target hydraulic pressure deriving portion 17e to derive the second target hydraulic pressure gradually to approximate the first target hydraulic pressure from the start of holding state.

For example, the second target hydraulic pressure deriving portion 17e derives the second target hydraulic pressure based on the first target hydraulic pressure by executing a primary retarding filtering process to the first target hydraulic pressure. In such case, it is possible to set the second target hydraulic pressure to a value outside the control dead zone in the pressure increasing state of the first target hydraulic pressure, by starting the execution of the above filtering process from the time the lower limit Pl of the control dead zone becomes equal to or more than 0 pa after the first target hydraulic pressure changed from the constant value state to the pressure increasing state. Further, it is possible to set the second target hydraulic pressure to a value outside the control dead zone in the pressure decreasing state of the first target hydraulic pressure, by starting the execution of the above filtering process from the time the upper limit Pu of the control dead zone becomes equal to or less than the first target hydraulic pressure in the constant value state of the first target hydraulic pressure after the first target hydraulic pressure changed from the constant value state to the pressure decreasing state.

It is noted that the second target hydraulic pressure may be set considering the factors of mechanical delay associated with the structure elements (such as, hydraulic passages, orifices, pressure receiving areas, sealing members, or brake fluid viscosity, etc.). In such setting, the second target hydraulic pressure is set in further phase retarded side, comparing the setting without consideration of such mechanical delay factors.

The actual hydraulic pressure obtaining portion 17f obtains the servo pressure (actual hydraulic pressure corresponding to an actual hydraulic pressure in the hydraulic pressure chamber: actual value of the hydraulic pressure in the hydraulic pressure chamber) in the output chamber R12 (and servo chamber R5) from the pressure sensor 26a. The servo pressure obtained by the actual hydraulic pressure obtaining portion 17*f* is outputted to the control dead zone control portion 17*g* and the feed-back control portion 17*h*.

The control dead zone control portion 17*g* obtains the control dead zone (first threshold value and second threshold value) from the control dead zone deriving portion 17*c* and at the same time obtains the actual hydraulic pressure from the actual hydraulic pressure obtaining portion 17*f*, whereby, when the actual hydraulic pressure is within the control dead zone, the control dead zone control portion 17*g* executes the control dead zone control. In the control dead zone control, the pressure increasing valve 15*b*7 is closed during the pressure increasing control (at this time, the pressure decreasing valve 15*b*6 is in a closed state) and the pressure decreasing valve 15*b*6 is closed during the pressure decreasing control (at this time, the pressure increasing valve 15*b*7 is in a closed state). Further, in the control dead zone control, both pressure decreasing valve 15*b*6 and pressure increasing valve 15*b*7 are closed during a holding control where the hydraulic pressure of the hydraulic pressure chamber is held to a constant pressure. As explained, the control dead zone control portion 17*g*, which executes the control for suppressing the change of the actual hydraulic pressure when the actual hydraulic pressure is within the control dead zone, corresponds to the control portion (of the invention).

The feed-back control portion 17*h* obtains the second target hydraulic pressure from the second target hydraulic pressure deriving portion 17*e* and at the same time obtains the actual hydraulic pressure from the actual hydraulic pressure obtaining portion 17*f* to control the pressure decreasing valve 15*b*6 and pressure increasing valve 15*b*7 so that the actual hydraulic pressure approximates the second target hydraulic pressure. In detail, the feed-back control portion 17*h* executes a feed-back control to the pressure decreasing valve 15*b*6 and the pressure increasing valve 15*b*7 based on the deviation or the difference in hydraulic pressure between the actual hydraulic pressure and the second target hydraulic pressure. The feed-back control portion 17*h*, which executes a control of making the actual hydraulic pressure approximate the second target hydraulic pressure, corresponds to the control portion (of the invention).

It is noted here that the feed-back control portion 17*h* obtains the control dead zone from the control dead zone deriving portion 17*c*, and the feed-back control portion 17*h* does not execute the feed-back control when the actual hydraulic pressure is within the control dead zone since the execution of the control dead zone control is prioritized to the feed-back control. In other words, the feed-back control portion 17*h* executes the feed-back control when the actual hydraulic pressure is outside the control dead zone.

Figure 3:
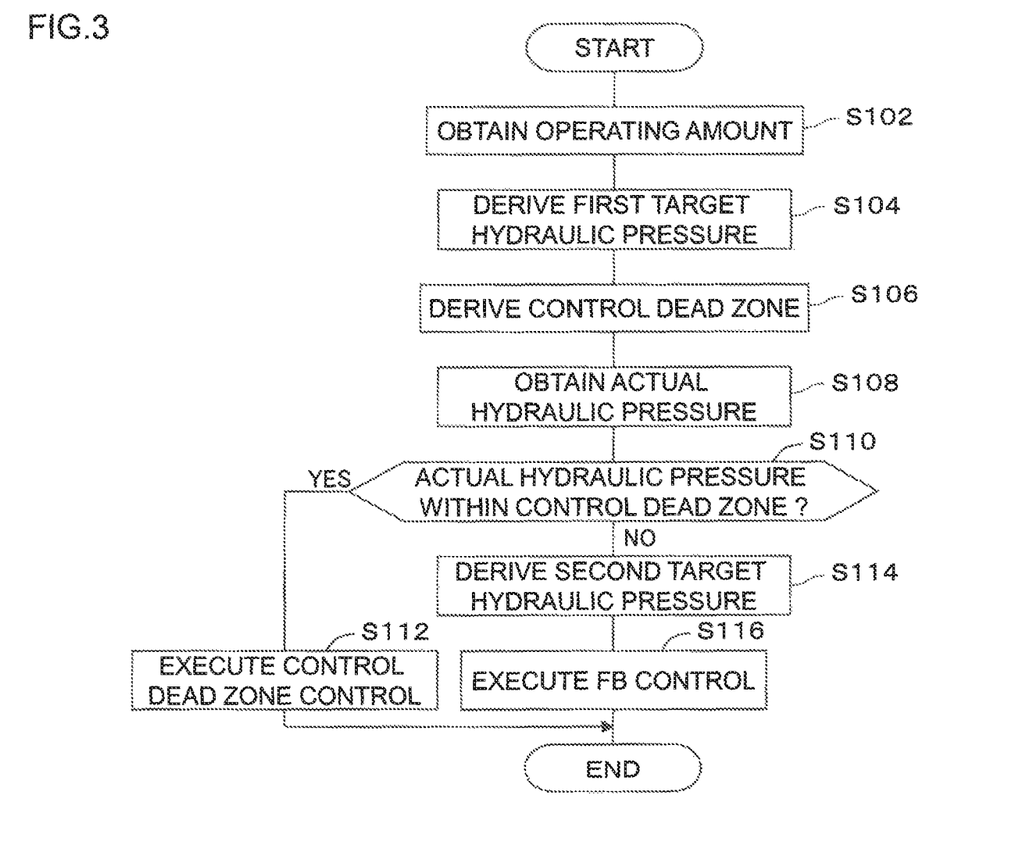
FIG. 3 is a flowchart of a control program which is executed at the brake ECU indicated in FIG. 1.

Further, the operation of the vehicle braking device will be explained with reference to the flowchart shown in FIG. 3. The brake ECU 17 executes the program along the flowchart per every predetermined short time.

The brake ECU 17 obtains the operating amount of the brake pedal 11 from the stroke sensor 11*c* at the step S102. The step S102 corresponds to the step for execution process by the operating amount obtaining portion 17*a*, as explained above. It is noted here that as an alternative way, at the step S102, the required braking force (or the required deceleration) may be obtained from other systems such as for example, a pre-crash system in which a collision is prevented by generating automatically the braking force when the system detects a high risk of collision.

At the step S104, the brake ECU 17 derives the first target hydraulic pressure in response to the operating amount (stroke) or the required braking force from other system. The step S104 corresponds to the step for execution process by the first target hydraulic pressure deriving portion 17*b*, as explained above.

At the step S106, the brake ECU 17 derives the control dead zone from the first target hydraulic pressure derived at the step S104. The step S106 corresponds to the step for execution process by the control dead zone deriving portion 17*c*, as explained above.

At the step S108, the brake ECU 17 obtains the servo pressure which is the actual hydraulic pressure from the pressure sensor 26*a*. The step S108 corresponds to the execution process by the actual hydraulic pressure obtaining portion 17*f*, as explained above.

The brake ECU 17 judges at the step S110 whether or not the actual hydraulic pressure obtained at the step S108 is a value within the control dead zone derived at the step S106. When the value of the actual hydraulic pressure is within the control dead zone, the brake ECU 17 advances the program to the step S112 and when the value of the actual hydraulic pressure is outside the control dead zone, the brake ECU 17 advances the program to the step S114.

At the step S112, the brake ECU 17 executes the control dead zone control, as explained above. The step S112 corresponds to the execution process by the control dead zone control portion 17*g*, as explained above.

At the step S114, the brake ECU 17 derives the second target hydraulic pressure from the first target hydraulic pressure. The step S114 corresponds to the step for execution process by the second target hydraulic pressure deriving portion 17*e*, as explained above. At the step S116, the brake ECU 17 executes the feed-back control to the pressure decreasing valve 15*b*6 and the pressure increasing valve 15*b*7 based on the actual hydraulic pressure obtained at the step S108 and the second target hydraulic pressure derived at the step S114. The step S116 corresponds to the step for execution process by the feed-back control portion 17*h*, as explained above.

Figure 4:
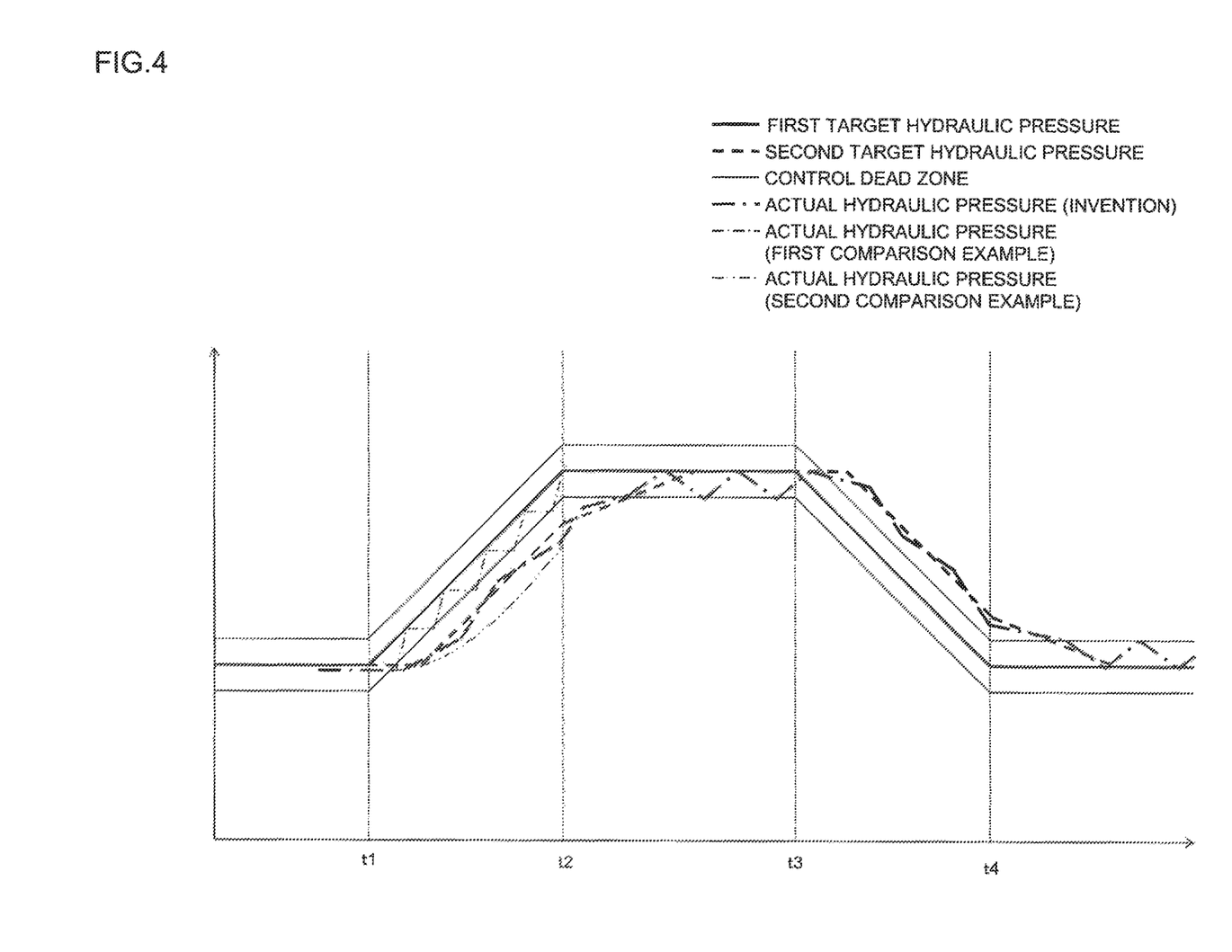
FIG. 4 is a time chart which indicates the operation of the vehicle braking device of the invention.

The operation of the vehicle braking device explained above will be explained with reference to the time chart shown in FIG. 4.

At the time t1, the depression of the brake pedal 11 starts. During the time period from the time t1 to the time t2 (during the pressure increasing control), the brake pedal 11 is under a depression state and during the time period from the time t2 to the time t3, the brake pedal 11 is held to a predetermined operating amount (during the holding control). Further, at the time t3, releasing operation of the brake pedal 11 starts. During the time period from the time t3 to the time t4 (during the pressure decreasing control), the brake pedal 11 is under a releasing state and after the time t4, the brake pedal 11 is in a released state (the state that the brake pedal is not depressed).

It is noted that the bold solid line indicates the first target hydraulic pressure, the bold dotted line indicates the second target hydraulic pressure, the fine solid line indicates the control dead zone, the bold one-dot chain line indicates the actual hydraulic according to the invention, the fine one-dot chain line indicates the actual hydraulic pressure according to a first comparison example and the fine two-dot chain line indicates the actual hydraulic pressure according to a second comparison example.

In the first comparison example, the actual hydraulic pressure is adjusted by setting only the first target hydraulic pressure and the control dead zone without setting the second target hydraulic pressure. Accordingly, since the actual hydraulic pressure is adjusted by the control dead zone control explained above, the actual hydraulic pressure becomes a stepwise increasing state where the hydraulic pressure holding state occurs frequently. Further, according to the second comparison example, the second target hydraulic pressure is set relatively largely deviated from the first target hydraulic pressure. Accordingly, a relatively large response delay is generated at the actual hydraulic pressure.

To these comparison examples, according to the invention, during the pressure increasing control, the pressure increasing valve 15b7 and the pressure decreasing valve 15b6 are feed-back controlled based on the actual hydraulic pressure and the second target hydraulic pressure and during the pressure decreasing control, the pressure increasing valve 15b7 and the pressure decreasing valve 15b6 are feed-back controlled based on the actual hydraulic pressure and the second target hydraulic pressure. As a result, the actual hydraulic pressure can be appropriately adjustably controlled relative to the second target hydraulic pressure and accordingly, can be appropriately adjustably controlled relative to the first target hydraulic pressure with some delay in the retarding side.

As apparent from the explanation above, in order to control the braking force applied to the vehicle wheel, assuming that the control dead zone (dead zone) is defined to be a value between the lower limit Pl (a first threshold value) of the control dead zone which is smaller than the first target hydraulic pressure (a first target value) which is a target value of the servo pressure (physical quantity) as an object to be controlled and an upper limit Pu (a second threshold value) of the control dead zone which is greater than the first target hydraulic pressure, the vehicle braking device performs a following control which makes the actual hydraulic pressure follow the first target hydraulic pressure when the actual hydraulic pressure (actual value of the physical quantity) is outside the control dead zone and performs a suppression control for suppressing the change of the actual hydraulic pressure when the actual hydraulic pressure is within the control dead zone. According to the vehicle braking device structured above, while the first target hydraulic pressure is increasing, when the actual hydraulic pressure becomes a value within the control dead zone, the change of the actual hydraulic pressure is suppressed. Then, the actual hydraulic pressure may become a value outside the control dead zone due to such suppression of the change. Then, the actual hydraulic pressure follows the first target hydraulic pressure and then again the actual hydraulic pressure becomes the value within the control dead zone. Thus, the actual hydraulic pressure increases (or decreases) stepwise. (See the first comparison example).

Therefore, the vehicle braking device according to the embodiment, the second target hydraulic pressure deriving portion 17e (setting portion) sets the second target hydraulic pressure which follows the first target hydraulic pressure and which is smaller than the first target hydraulic pressure when the first target hydraulic pressure is increasing and the FB control portion 17h (control portion) executes a control to make the actual hydraulic pressure approximate the second target hydraulic pressure. As a result, according to the vehicle braking device, when the first target hydraulic pressure is increasing, the second target hydraulic pressure (second target value) which follows the first target hydraulic pressure and which is smaller than the lower limit Pl of the control dead zone is set to thereby make the actual hydraulic pressure approximate the first target hydraulic pressure. Thus, while keeping the actual hydraulic pressure to follow the first target hydraulic pressure, the actual hydraulic pressure is suppressed from becoming the value within the control dead zone and eventually is suppressed from stepwise increasing. Thus, the vehicle braking device which can improve the pressure adjustment control performance can be proposed.

Further, the second target hydraulic pressure deriving portion 17e (setting portion) sets the second target hydraulic pressure which follows the first target hydraulic pressure and which is greater than the first target hydraulic pressure when the first target hydraulic pressure is decreasing. In this way also the actual hydraulic pressure is suppressed from becoming a value within the control dead zone while keeping the actual hydraulic pressure to follow the first target hydraulic pressure and eventually is suppressed from stepwise decreasing. When the first target hydraulic pressure is decreasing.

Further, the second target hydraulic pressure deriving portion 17e sets the second target hydraulic pressure to a value outside the control dead zone.

Accordingly, since the second target hydraulic pressure is set to a value outside the control dead zone during the pressure increasing or decreasing control, the actual hydraulic pressure is suppressed from entering the control dead zone. As a result, the pressure increasing valve 15b7 and the pressure decreasing valve 15b6 are closed to suppress a generation of the stepwise actual hydraulic pressure increase phenomenon. Accordingly, the vehicle braking device which can improve the pressure adjustment control performance during the pressure increasing or decreasing control can be proposed.

Further, the second target hydraulic pressure deriving portion 17e derives the second target hydraulic pressure from at least one of the magnitude and inclination of the first target hydraulic pressure.

According to this structure, the second target hydraulic pressure can be set in response to the magnitude or the inclination of the first target hydraulic pressure. Thus, the vehicle braking device which can improve the pressure adjustment control performance can be proposed.

The second target hydraulic pressure deriving portion 17e makes the second target hydraulic pressure gradually approximate the first target hydraulic pressure when the change width of the first hydraulic pressure is in a constant state within a predetermined value. According to this structure, when the change width of the first hydraulic pressure is in a constant state in which the first hydraulic pressure is within a predetermined value (for example, when the operation of the brake pedal 11 is held to a constant operating amount), the second target hydraulic pressure is set to gradually approximate the first target hydraulic pressure and accordingly, switching over operation of the target hydraulic pressure between the pressure in the pressure increasing control or the pressure in the decreasing control and the pressure under the state that the brake pedal 11 operation is held can be properly performed and eventually the pressure adjustment control performance of the vehicle braking device can be further improved.

Further, the vehicle braking device includes the pressure increasing valve 15b7 (pressure increasing electromagnetic valve) disposed between the output chamber R12 and the servo chamber R5 (hydraulic pressure chamber) and the accumulator 15b2 (high pressure source) which has a high pressure therein for adjusting the flow-rate of brake fluid flowing out of the accumulator 15b2 into the output chamber R12 and the servo chamber R5 and the pressure decreasing valve 15b6 (pressure decreasing electromagnetic valve) disposed between the output chamber R12 and the servo chamber R5 and the reservoir 15b1 (low pressure source)

which has a low pressure lower than the pressure of the accumulator 15*b*2 therein for adjusting the flow-rate of brake fluid flowing out of the output chamber R12 and the servo chamber R5 into the reservoir 15*b*1 and the control dead zone control portion 17*g* (control portion) closes the pressure increasing valve 15*b*7 and the pressure decreasing valve 15*b*6 when the actual hydraulic pressure is a value within the control dead zone.

According to this structure, by controlling the pressure increasing valve 15*b*7 and the pressure decreasing valve 15*b*6, the control in which the change of the actual hydraulic pressure can be suppressed can be easily and surely performed.

As explained, in the embodiment, the invention is applied to a hydraulic pressure type booster, however, the invention is also applicable to the electric booster which includes an electric motor etc., as the drive source to boost the operating force applied to the brake operating member.

The invention claimed is:

1. A vehicle braking device which performs a following control which makes an actual value of a physical quantity which is associated with a braking force to be applied to a vehicle wheel follow a first target value which is a target value of the physical quantity when the actual value of the physical quantity is a value outside a dead zone and a suppression control which suppresses a change of the actual value of the physical quantity when the actual value of the physical quantity is a value within the dead zone in order to control the physical quantity associated with the braking force to be the first target value which is the target value of the physical quantity, assuming that the dead zone is defined to be a value between a first threshold value which is smaller than the first target value and a second threshold value which is greater than the first target value, the vehicle braking device comprising a processor configured to:
 set a second target value which follows the first target value and which is smaller than the first target value, when the first target value is increasing; and
 perform a control to make the actual value of the physical quantity approach the second target value.

2. The vehicle braking device according to claim 1, wherein:
 the processor sets the second target value which follows the first target value and which is larger than the first target value, when the first target value is decreasing.

3. The vehicle braking device according to claim 1, wherein: the processor sets the second target value to a value outside the dead zone.

4. The vehicle braking device according to claim 1, wherein: the processor derives the second target value from at least one of a magnitude and an inclination of the first target value.

5. The vehicle braking device according to claim 1, wherein: the processor makes the second target value gradually approach the first target value when a change width of the first target value is a constant state within a predetermined value.

6. The vehicle braking device according to claim 1, wherein the processor sets the second target value to a value obtained by executing a primary retarding filtering process to the first target value.

7. The vehicle braking device according to claim 1, wherein
 the physical quantity corresponds to a hydraulic pressure in a hydraulic pressure chamber; and the vehicle braking device includes:
 a pressure increasing electromagnetic valve disposed between the hydraulic pressure chamber and a high pressure source which has a high pressure therein for adjusting a flow-rate of a brake fluid from the high pressure source to the hydraulic pressure chamber; and
 a pressure decreasing electromagnetic valve disposed between the hydraulic pressure chamber and a low pressure source which has a low pressure therein lower than the high pressure of the high pressure source for adjusting a flow-rate of the brake fluid from the hydraulic pressure chamber to the low pressure source, and wherein the processor closes the pressure increasing electromagnetic valve and the pressure decreasing electromagnetic valve, when an actual hydraulic pressure which is an actual value of the hydraulic pressure in the hydraulic pressure chamber is a value within the dead zone.

* * * * *